United States Patent

[11] 3,613,012

[72] Inventor Claude H. Feistel
Austin, Tex.
[21] Appl. No. 865,652
[22] Filed Oct. 13, 1969
[45] Patented Oct. 12, 1971
[73] Assignee Tracor, Inc.
Austin, Tex.

[54] ADAPTIVE BLANKING APPARATUS
6 Claims, 3 Drawing Figs.

[52] U.S. Cl. .......... 325/474, 325/371, 325/478
[51] Int. Cl. .......... H04b 1/10
[50] Field of Search .......... 325/371, 473, 474, 478, 479, 480, 305

[56] References Cited
UNITED STATES PATENTS

| | | | |
|---|---|---|---|
| 2,947,861 | 8/1960 | Ulstad et al. .......... | 325/305 |
| 3,114,884 | 12/1963 | Jakowatz .......... | 325/474 X |
| 3,191,124 | 6/1965 | Brown .......... | 325/478 |
| 3,387,222 | 6/1968 | Hellwarth et al. .......... | 325/474 X |

*Primary Examiner*—Robert L. Richardson
*Attorneys*—Arnold Roylance, Kruger & Durkee, Tom Arnold, Donald C. Roylance, Walter Kruger, Bill Durkee and Frank S. Vaden, III

ABSTRACT: An adaptive blanking circuit includes a blanking switch operable by a threshold detector network, in turn controlled by an AGC network, the AGC network including a variable amplifier, a bipolar threshold detector and a duty cycle comparator for adjusting the incoming signal when it exceeds a reference level for a predetermined percentage of time and for discriminating against high-impulse noise.

Claude H. Feistel
INVENTOR

BY Arnold, Roylance, Kruger & Durkee
ATTORNEYS

Claude H. Feistel
INVENTOR

BY Arnold, Roylance, Kruger & Durkee
ATTORNEYS

ADAPTIVE BLANKING APPARATUS

FIELD OF THE INVENTION

This invention relates to adaptive noise blanking systems and more specifically to a new and improved noise blanking system for discriminating against noise, suppressing impulses and improving the signal-to-noise ratio of a received waveform prior to the detection thereof.

Description of the Prior Art

Discriminating against impulsive atmospheric interference and other such noise has long been a recognized problem to reliable signal detection, such as in the receivers operating to receive CW or pulsed signals modulated on carrier waves at VLF and LF frequencies. In fact, the reception of wide band spectrums having a high noise-to-signal ratio can be disruptive to subsequent detection and indication, and even can be harmful to subsequent components in the circuit.

Blanking circuits have successfully been used in the front end of receivers for disconnecting the detectors therein from the receiver spectrum during periods when impulses are so high that either the circuits would be overdriven or the signal content in the spectrum would be blanketed by high noise peaks. One straight forward and effective circuit approach employed in blanking circuits has included therein an electronic switch in the path of the receiver waveform, such switch opening when the peak value of the waveform envelope applied thereto exceeds a preset threshold level. Once the signal-plus-noise waveform is adjusted to a satisfactory reception level, the threshold is preset at a fixed level above the peak level of the received waveform envelope to operate on high peaks which, if left to pass through, would mask or otherwise unsatisfactorily interfere with signal reception.

It may be seen, however, that any signal exceeding the threshold level will activate such a blanking circuit. There is no discrimination between noise impulses exceeding the threshold level and meaningful signal components exceeding the threshold level.

It is also common to provide an automatic gain control (AGC) circuit in the front end of receivers to adjust the level of the received waveform so that it is maintained at a relatively constant level prior to detection. Typically, such an AGC circuit includes an averaging network so that the AGC adjustment is controlled by the rms value of the input waveform over a time interval, rather than be the instantaneous value of the input where the gain adjustment would have to instantaneously attempt to change when the input spectrum changes in level. Employing an AGC network ahead of a blanking circuit in a receiver will reduce the number of incidents that blanking would otherwise occur when meaningful signals are unusually high, rather than when noise impulses are unusually high.

Such a combination, although the best combination known to be available prior to the current invention, does not discriminate against noise, does give undue weight to large impulses in determining rms signal-plus-noise value, and generally fails to improve the signal-to-noise ratio of the received waveform prior to the detection of the desired signal.

When the signals are of special character, means have been devised to improve on the AGC and blanking circuit combination just described. For example, Hook U.S. Pat. No. 3,214,700 describes a variable threshold signal detection system for detecting the presence of desired low duty cycle signals in noise, such as detecting occurrences when two coherent signals fall within a selected time period (are in correlation). The spectrum to which the Hook system operates includes signal pulses and concomitant spurious signal pulses. Meaningful operation of subsequent detection and indicator or operating circuit is possible only when a statistically acceptable number of spurious signals occur over a preselected time interval. If the threshold level of a threshold network in the input section is set at a proper level, only an acceptable number of spurious signals will pass. If the threshold is set too low, however, an unacceptable number will pass. Finally, if the threshold is set too high, meaningful signals will be blocked.

To provide automatic setting of the threshold level for the threshold network in the input section, a threshold setting circuit is employed. This circuit employs another threshold network for passing a trial number of concomitant signal and noise pulses to be applied to a counter; a counter for determining the number of pulses over a sampling time interval that are received from this second threshold network; and a comparator for comparing the sample count with an acceptable count to produce an error signal when the acceptable count is exceeded. This error signal is fed back as a bias add-on signal to the threshold network in the input section to which the concomitant signals and noise are applied, as well as to the threshold network in the threshold setting circuit. These two threshold networks operate at different threshold levels, the threshold of the input section threshold network operating at a higher threshold level than the threshold network of the threshold setting circuit.

In another special application Ulstad et al. U.S. Pat. No. 2,947,861 shows, in a space or frequency diversity receiver group, a variable threshold level receiver having a weighting-signal generator connected to the IF amplifier to logarithmically detect the received signal and to provide a variable weighting signal that actuates a noise cutoff circuit to disconnect the receiver when the received signal level and bandwidth characteristics combined fall below certain limits.

Heretofore, however, there has not been a satisfactory technique developed to give any better performance in the usual general purpose receiver better than the conventional AGC and blanking circuit combination above described.

It is therefore a feature of the present invention to provide an improved circuit for use in a general purpose receiver application which discriminates against noise in an AGC-and-noise-blanking operation.

It is a further feature of this invention to provide an improved circuit for enhancing the signal-to-noise ratio of the incoming received spectrum prior to its detection.

It is another feature of this invention to provide an improved circuit that includes an AGC function in establishing the threshold level at which a blanking circuit operates.

It is still another feature of this invention to provide an improved circuit that includes an AGC network, which incorporates a first threshold circuit, for establishing the signal level to a blanking circuit, operationally including another threshold circuit.

It is yet another feature of this invention to provide an improved blanking circuit that incorporates an AGC network for controlling a blanking switch circuit, each the AGC circuit and the blanking switch circuit including threshold detectors capable of operating at different threshold levels, the AGC network also discriminating against high peak impulses in establishing its gain level.

SUMMARY OF THE INVENTION

A preferred embodiment of the present invention for a typical VLF receiver application comprises a variable gain network for receiving the input noise and meaningful signals in a wideband spectrum, a blanking switch also connected normally to receive the input wideband spectrum and a controlled threshold detector connected to the variable gain network for operating the blanking switch when the input to the detector exceeds a predetermined threshold level. The variable gain network includes a variable amplifier; a bipolar voltage comparator, which produces a rectangular pulse when the voltage from the variable amplifier exceeds a preset threshold for the bipolar comparator; and a duty cycle comparator, which develops an average voltage represented by the rectangular pulses over a predetermined time interval and compares this average voltage with a standard voltage, thereby establishing a difference voltage used to control the gain of the variable amplifier. The predetermined time interval is such and the standard voltage is such that the rectangular pulses from the bipolar comparator are produced about seven percent of the time (the percentage of time statistical studies show that VLF atmospheric noise exceeds its r.m.s. value). The input connection to the controlled threshold detector is to the output of the variable amplifier, thereby providing an adjusted input thereto. The threshold of this controlled threshold detector is set to operate at a level which permits satisfactory operation and is normally set above the peak level of cyclical signals so that the danger of blanking meaningful signals is eliminated. Of course, sufficiently large noise impulses will cause blanking, even though these noise impulses have passed through the variable amplifier adjustment.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.

In the Drawings

DESCRIPTION OF PREFERRED EMBODIMENTS

Figure 1:
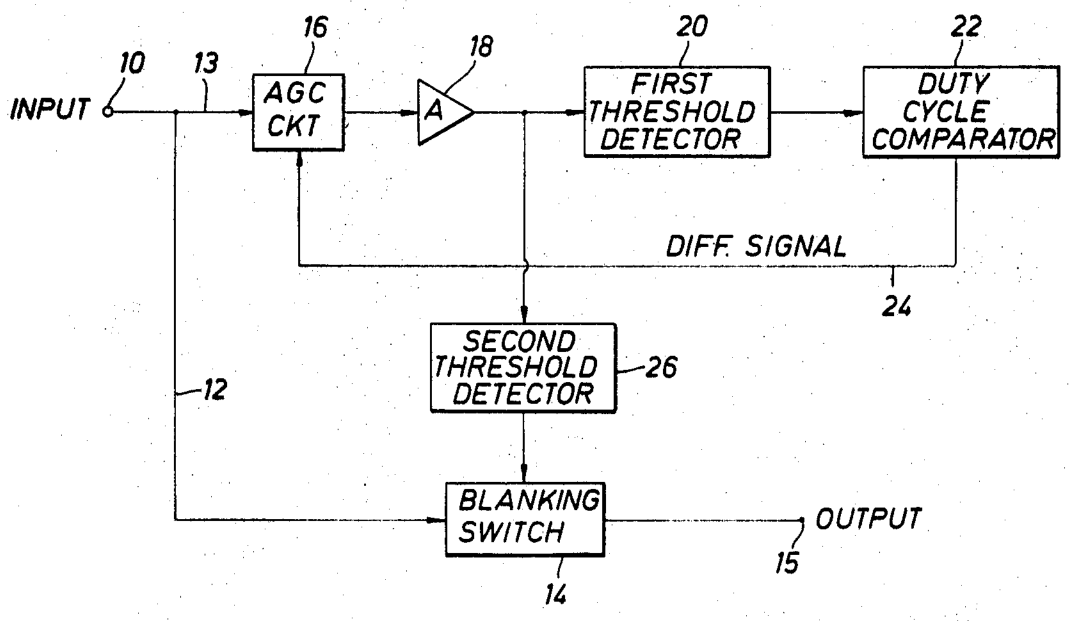
FIG. 1 is a simplified block diagram of a preferred embodiment of an adaptive blanking circuit in accordance with the present invention.
Figure 2:
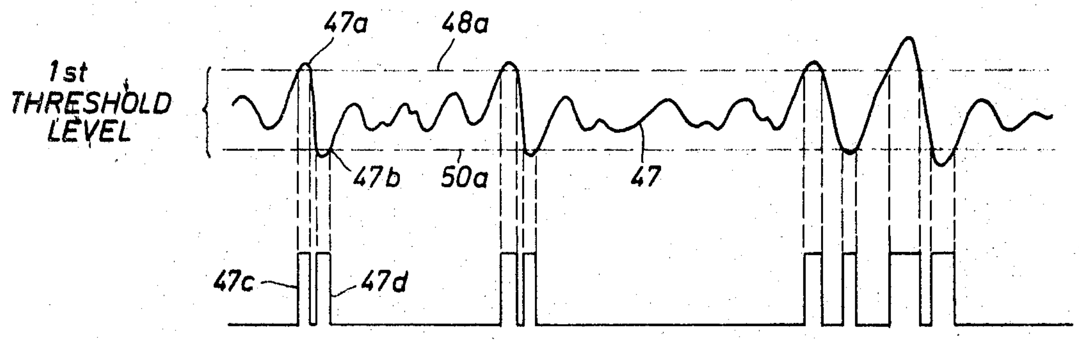
FIG. 2 is a waveform diagram illustrating the operation of the first threshold detector of the illustrated embodiment of the present invention.

Now referring to the drawings and first to FIG. 1, a simplified block diagram is shown of a preferred embodiment incorporating the invention. The input wideband spectrum including both signals and noise is received at input terminal 10. Typically, terminal 10 is the connection to the antenna (not shown) in a VLF or LF radio receiver. The signal content of the spectrum usually includes one or more cyclical-type waves (e.g., sine waves) or pulsed sine waves, although other types of signals may be present. The atmospheric noise will be of a random nature, having occasional sporadic impulses sizeably larger than the more continuous, and to some extent, ever-present, background interference. Of course, the general level of both the noise and the signals in the spectrum are subject to variation with conditions. The resulting composite waveform received at terminal 10 in a simplified appearance for purposes of discussion, is shown in FIG. 2.

The received signal at terminal 10 is applied on line 12 to electronic blanking switch 14 and on line 13 to a controlled variable gain means in the form of AGC circuit 16. Output terminal 15 from blanking switch 14 provides connection for subsequent amplifiers, detectors, indicators, and other operating circuits (not shown), as desired.

One or more stages of conventional RF amplifier 18 are connected to AGC circuit 16 to provide isolation and whatever amplification is desired. Usually, this amplification is linear amplification and independent of frequency and the level of the voltage applied thereto.

A first threshold detector 20 is connected to amplifier 18. The setting of the threshold level for detector 20 may be better understood by reference to FIG. 2. The composite waveform applied to detector 20 includes a series of peak occurrences, such as peak 47*a*. If a sufficiently long interval is assumed (as represented by the entire interval which is illustrated), the noise in the spectrum may be considered to be completely random. Arthur D. Watt, as stated in his book VLF Radio Engineering, Pergamon Publishing Co., Section 5.4.1, has determined that VLF atmospheric noise exceeds its r.m.s. value about 7 percent of the time. Assuming the illustrated embodiment of FIG. 1 is operating in connection with a VLF receiver, the threshold level is adjusted so that the peaks of the spectrum exceed the threshold 7 percent of the time (or perhaps slightly more). This would make the threshold setting be approximately the r.m.s. value so that there would be an output occurring from threshold detector 20 a predetermined percentage of the time of about 7 percent. The subsequent circuits to be described readjusts the output level of AGC circuit 16 so that the input to the detector satisfies these conditions, thereby eliminating any need to reset the threshold level of the detector after it is once set.

Each time the threshold is exceeded, an internal rectangular signal is produced inside the detector. The width of each signal pulse is determined by how long the peak stays above the threshold. The rectangular pulses are produced at a uniform amplitude regardless of the actual voltage level of the waveform peak.

The output rectangular pulses thus produced are then applied to duty cycle comparator 22, this comparator typically including both a voltage averager and a comparator. The averager has a time constant sufficiently long to provide a duty cycle for the circuit such that the Watt's-determined statistics are met. Typically, such time constant is about 30 seconds.

The voltage from the averager is compared with a preset referenced voltage which produces a zero-change output when the 7 percent statistic is holding true. However, if the rectangular pulses represent more than 7 percent of the time interval or, alternatively, less than 7 percent of the time interval, then comparator 22 produces an appropriate change or difference voltage signal on line 24. The amount of voltage difference above or below the zero-change value is determined by the rectangular pulses being more or less, respectively, than 7 percent of the time interval.

This difference voltage is applied back to AGC circuit 16, to change the gain thereof so as to reduce, after a period of time, the difference signal on line 24 again to a zero-change value. It should be observed that by this technique, the threshold of first threshold detector 20 is maintained at a constant value, the time period of the voltage averager in the duty cycle comparator is maintained at a constant value and the reference voltage for the comparator circuit in the duty cycle comparator is maintained at a constant value. However, the input spectrum has been subjected to a type of AGC action, wherein the input waveform value has determined the gain of AGC circuit 16. Moreover, it has not been an average voltage value or r.m.s. voltage value measure of the waveform that has determined the gain of AGC circuit 16, but rather a value that the input waveform exceeded a preset level during a predetermined time interval. This type of AGC action effectively discriminates against sporadically occurring noise impulses and in favor of a gradually building signal, which would not sporadically rise above the threshold level for detector 20, as does noise.

The output from AGC circuit 16, which has undergone the type of AGC action just described, is applied to second threshold detector 26, typically after such output has been amplified in amplifier 18. Because it has been determined that the subsequent circuits connected to output terminal 15 can tolerate a certain amount of noise, even of the impulse variety, the threshold level for detector 26 is set at a value which may be slightly higher than the threshold value for detector 20. Thus, only of the largest types of impulses when considered in context with the signals and background noise being simultaneously received will cause detector 26 to produce an output. And, even these pulses are first subjected to AGC action in the first section of the circuit above.

The output of second threshold detector 26 is connected to blanking switch 14 as a control signal therefor. When detector 26 produces an output to blanking switch 14, the signal on line 12 is interrupted or disconnected from output 15. Therefore, the signal from detector 26 may be considered to be an enabling signal for blanking switch 14.

Figure 3:
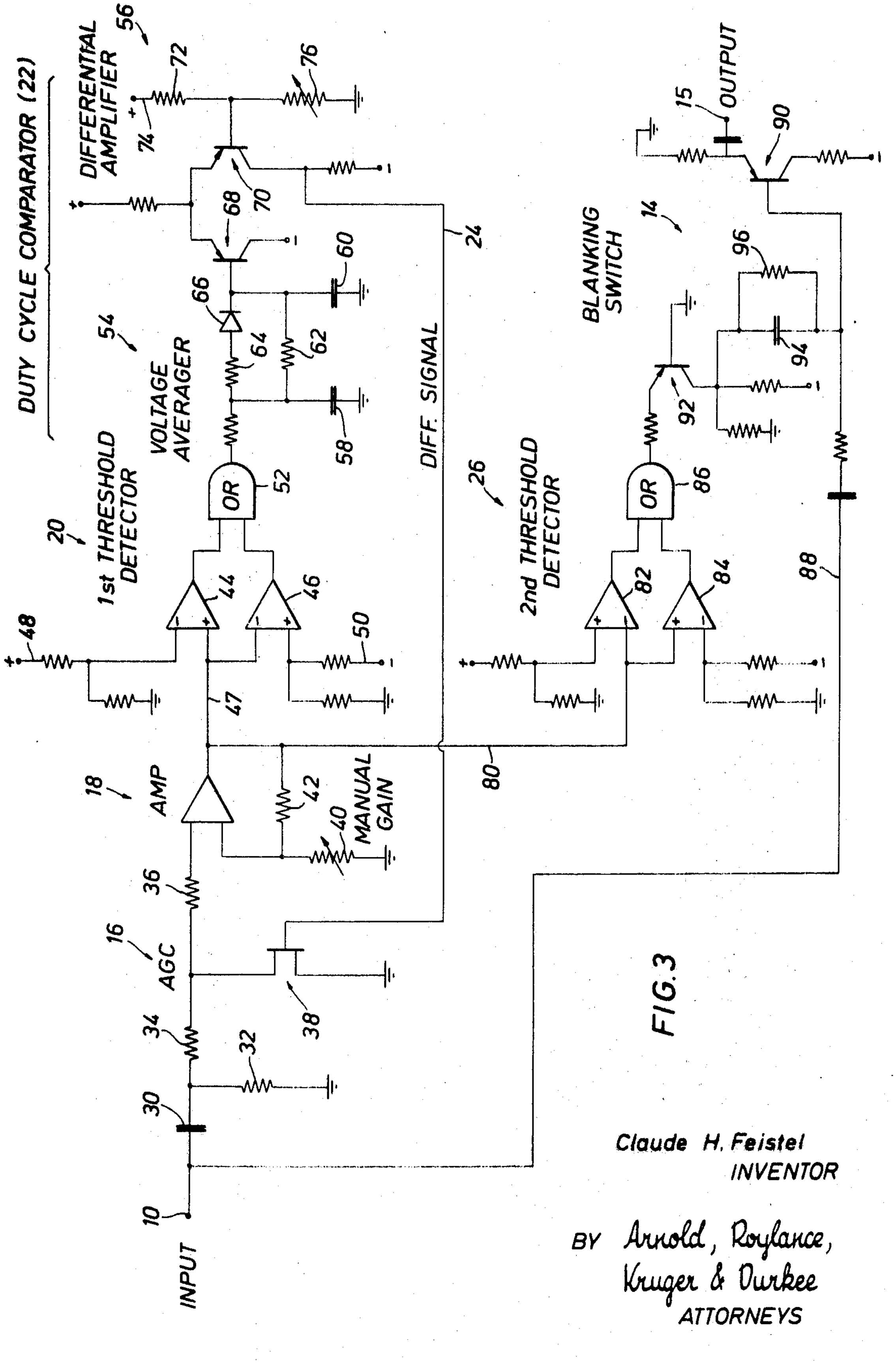
FIG. 3 is a diagram, partly in block and partly in schematic form, illustrating a detailed embodiment of the present invention.

FIG. 3 shows a diagram partly in schematic form and partly in block form which illustrates a preferred embodiment for implementing the block diagram shown in FIG. 1. The adaptive receiver blanking circuit which is there illustrated receives an input at terminal 10 and, after a coupling stage in the form of capacitor 30 and resistor 32, the input is applied to AGC circuit 16. As illustrated, the circuit primarily includes a voltage reduction resistor 34 and a voltage divider comprising resistor 36 and field effect transistor (FET) 38. FET 38 is connected with its source electrode to ground, its gate electrode to receive a control signal and its drain electrode to resistor 36. In conventional manner, when the control gate signal is varied the effective resistance of the FET varies, which in turn, varies the voltage divider output.

The output from AGC circuit 16 is applied to amplifier 18, which may be considered to be a wideband, RF amplifier for providing a fixed gain stage, for example 60 db. gain. The gain of the amplifier may be manually adjusted with resistor 40, connected in a voltage divider with feedback resistor 42.

The output from amplifier 18 is applied to first threshold detector 20 comprising bipolar comparators 44 and 46. The positive excursions of the signal applied to comparator 44 is referenced against a fixed positive reference applied to terminal 48 and the input negative excursions are applied to comparator 46 and referenced to a negative reference 50. Reference voltages at terminals 48 and 50 are nominally the same value, only of opposite polarity.

Each of comparators 44 and 46 of first threshold detector 20 provides an output when the incoming voltage applied to the comparator exceeds the reference voltage. A flip-flop or similar two-level output circuit may be included in comparator 44 to provide a rectangular output. That is, the output is held normally at a first level, normally zero. When the applied waveform excursion exceeds the reference, this leading edge produces an output at the second level. When the excursion reduces below the reference this trailing edge returns the output from the comparator to the first level. Hence, it may be seen that the output amplitude is independent of how far the reference voltage is exceeded, but the width of the output pulse is determined by how long the input signal to the comparator exceeds the reference. FIG. 2 graphically illustrates this. The dotted lines represent threshold signals **48*a* and 50*a* and line 47 represents the composite signal spectrum applied to comparators 44 and 46. It may then be seen that peaks 47*a* and 47*b* are those portions of the composite spectrum which exceed reference level 48*a* and 50*a*, respectively. The negative reference is said to be exceeded when the applied voltage becomes more negative than the negative reference. Pulses 47*c* and 47*d* are the comparator output pulses for peaks 47*a* and 47*b***, respectively. As shown, the pulses are produced when either the positive or the negative reference is exceeded, the pulses themselves all being positive because of the bipolar connection of the comparators.

Outputs from the two comparators are applied to OR circuit 52 to produce a rectangular pulse output when there is an output from either comparator 44 and 46.

The signal from OR circuit 52 is applied to duty cycle comparator 22 comprising voltage average 54 and differential amplifier 56. The voltage averager 54 is primarily a low pass filter and an integrator with a time constant sufficiently long for the noise present in the input spectrum to be considered random in character. Capacitors 58 and 60 are connected to ground on either side of the parallel combination of resistor 62 and resistor 64 in series with diode 66 to provide the components of the averager circuit.

The output from the voltage averager is applied to the base of transistor 68, one of the pair of conventional PNP transistors in differential amplifier 56. The output from the differential amplifier is taken from the collector of the other transistor 70. The base of transistor 70 is connected to a voltage divider comprising fixed resistor 72 connected to a voltage reference level terminal 74 and adjustable resistor 76, connected to ground. It is the adjustment of this control that determines that there is an output from the comparators 7 percent of the time (assuming a VLF applied spectrum).

The output from the differential amplifier is the difference of the applied voltage and the reference voltage established at the base of transistor 70. This difference voltage or signal 24 is applied as the control signal to the gate electrode of FET 38.

Note that there will always be some voltage applied to gate electrode 38, but this will be a "zero-change" voltage for overall operation if the incoming signal is at a relatively constant level. However, difference signal 24 will be a change signal to effectively increase or decrease the resistance of FET transistor 38 depending upon whether the output from OR circuit 52 occurs more or less than 7 percent of the time.

The output from amplifier 18, which is the waveform 47 that has been subjected to the automatic gain control adjustment just described, is applied on line 80 to a second threshold detector 26. This detector may be assumed to be identical in operation to first threshold detector 20 and comprises bipolar comparators 82 (positive) and 84 (negative). The output from comparators 82 and 84 are applied to OR circuit 86, identical in action to that for OR circuit 52. The output from OR circuit 86 is applied to blanking switch 14 to electronically disconnect the input signal applied thereto on line 88 from output 15. The blanking switch may merely comprise a conventional transistor triode 90 connected as a switch and having its base connected to isolation transistor 92 receiving the output from OR circuit 86. When transistor 92 produces an output, the bias level on transistor 90 is raised so that transistor 90 is cut off. This condition exists until there is no longer an output from transistor 92. Capacitor 94 and resistor 96 connected in parallel therewith provide the necessary coupling from transistor 92.

The threshold level of the second threshold detector 26 is normally set at a higher level than the threshold for first threshold detector 20, on the order of 6 db. Hence, a regular increase of meaningful signal strength on line 80 will not cause a blanking output from OR circuit 86. However, noise pulses on line 80 will cause such an output.

It may be further observed that there is no AGC action for the input waveform applied to terminal 10 and which is connected to output 15 along line 88 to blanking transistor 90. The AGC action which is provided in the circuit produces a controlled level output for application to second threshold detector 26. Of course, AGC could be provided subsequent to output 15, if desired.

While a particular embodiment of the invention has been shown and primarily discussed, it will be understood that the invention is not limited thereto, since many modifications may be made and will become apparent to those skilled in the art. For instance, although amplifier 18 has been described merely as a linear, wideband amplifier, the amplifier network may include limiters for reducing erratic performance when operating under extremely high noise conditions. Also, differential signal 24 from duty cycle comparator 22 may be applied through a current gain amplifier prior to application to FET 38, if required to achieve satisfactory operation of the voltage divider in which FET 38 is included. Following second threshold detector 26, a pulse stretching network may be inserted to slightly prolong the blanking period, thereby allowing ample time for the receiver to recover after the input signal has been blanked by a high noise impulse. The duty cycle comparator might be implemented in the form of a digital counter, and digital comparator rather than in the analog form.

What is claimed is:

1. Blanking apparatus for interrupting a received noise-plus-signal waveform when the value of the waveform exceeds its r.m.s. value for a predetermined percentage of time, comprising variable gain means for receiving the noise-plus-signal waveform and producing an output therefrom in which the value of the waveform exceeds the r.m.s. value plus a fixed amount a predetermined percentage of time, said variable gain means including a linear amplifier controlled by an applied voltage, a bipolar comparator connected to said amplifier for producing a rectangular output during periods that the applied voltage exceeds either a positive or a negative preset threshold level, an averager connected to said bipolar comparator for producing an averaged voltage over a predetermined time interval, comparator means connected to said averager for producing a difference voltage when the averaged voltage is different from a preset voltage, said difference voltage being applied to said linear amplifier to produce said output therefrom, and switch means for disconnecting the received noise-plus-signal waveform when the output from said variable gain means exceeds a preset threshold level.

2. Blanking apparatus as set forth in claim 1 wherein said linear amplifier includes a field effect transistor.

3. Blanking apparatus as set forth in claim 1, wherein said percentage of time is about seven percent.

4. Blanking circuit means suitable for interrupting switch means through which a received noise-plus-signal waveform passes when the value of the waveform exceeds its r.m.s. value for a predetermined percentage of time, comprising variable gain means for receiving the noise-plus-signal waveform, first comparison means connected to said variable gain means for producing an output difference by which the output from said variable gain means exceeds a threshold voltage level, averaging means connected to said first comparison means for producing an average output over a selected time interval, said average voltage output applied to said variable gain means for controlling the gain thereof so that the r.m.s. output therefrom equals the threshold voltage level of said first comparison means, and to thereby permit the output difference from said first comparison means to occur for a predetermined percentage of the selected time interval, and second comparison means for producing an output when the output from said variable gain means exceeds a threshold voltage level higher than said threshold level of said first comparison means, the output thereof suitable for operating the switch means.

5. Adaptive receiver blanking means for establishing automatic gain control to a received signal-plus-noise waveform and interrupting said waveform during periods of high impulse noise, comprising variable gain means connected to receive the input signal-plus-noise waveform and controllable by an applied control voltage for producing a controlled output level, first bipolar, level-comparator means for producing a rectangular pulse during the time the controlled output level exceeds a first fixed voltage level, voltage averaging means connected to receive the rectangular pulses from said first bipolar, level-comparator means for producing an average voltage, said control voltage applied to said variable gain means being a function of said average voltage, second bipolar, level comparator means for producing an output when said controlled level output from said variable gain means exceeds a third fixed voltage level, said third fixed voltage level being higher than said first fixed voltage level, and switching means operably connected for interrupting said received signal-plus-noise waveform when there is an output from said second bipolar, level-comparator means.

6. Adaptive receiver blanking means for establishing automatic gain control to a received signal-plus-noise waveform and interrupting said waveform during periods of high impulse noise, comprising variable gain means connected to receive the input signal-plus-noise waveform and controllable by an applied control voltage for producing a controlled output level, first bipolar, level-comparator means for producing a rectangular pulse during the time the controlled output level exceeds a first fixed voltage level, voltage averaging means connected to receive the rectangular pulses from said first bipolar, level-comparator means for producing an average voltage over a fixed duty cycle, voltage comparison means for producing a voltage difference between a second fixed voltage level and the average voltage from said voltage averaging means, said voltage difference being applied as said control voltage to said variable gain means, second bipolar, level-comparator means for producing an output when said controlled level output from said variable gain means exceeds a third fixed voltage level, said third fixed voltage level being higher than said first fixed voltage level, and switching means operably connected for interrupting said received signal-plus-noise waveform when there is an output from said second bipolar, level-comparator means.